Nov. 30, 1926.
M. TRAPET
1,609,042
ELECTRIC CIGAR LIGHTER
Filed March 18, 1925
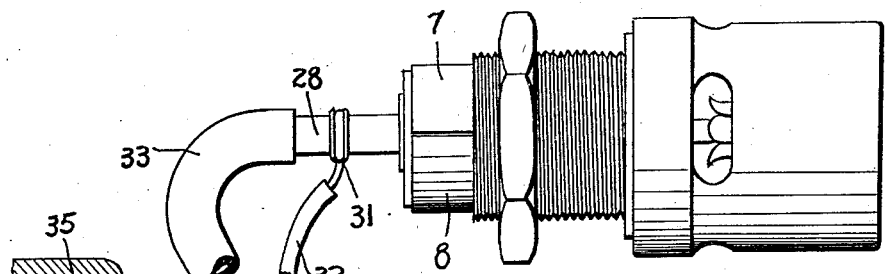
Fig. 1
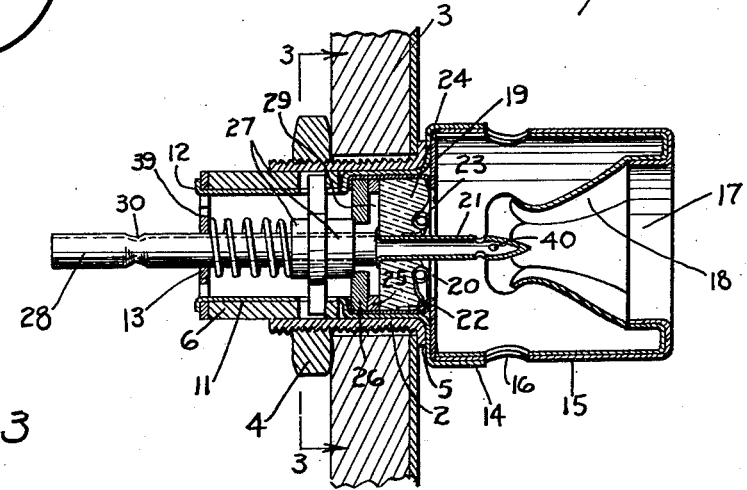
Fig. 2
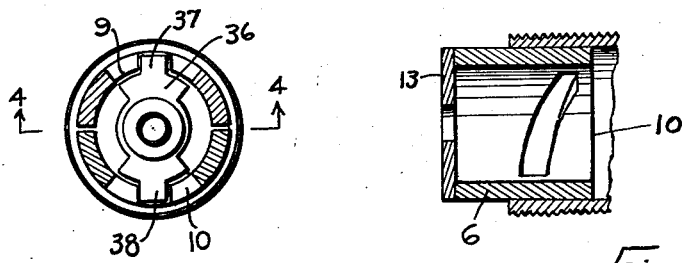
Fig. 3
Fig. 4
Inventor
Maurice Trapet.
by: Hazard and Miller
Attys.

Patented Nov. 30, 1926.

1,609,042

UNITED STATES PATENT OFFICE.

MAURICE TRAPET, OF LOS ANGELES, CALIFORNIA.

ELECTRIC CIGAR LIGHTER.

Application filed March 18, 1925. Serial No. 16,335.

This invention relates to electric cigar and cigarette lighters.

An object of the invention is to provide an electric cigar and cigarette lighter especially adaptable to use in connection with an automobile whereby an electric heating element may be energized by the storage battery of the automobile and a draft may be created adjacent to the heating element by means of a tubular connection with the intake manifold of the automobile motor.

With this type of electric cigar and cigarette lighter, it is possible to have the lighter permanently installed upon any convenient part of the motor vehicle, such as the instrument board and the driver may place a cigar or cigarette in the electric lighter and withdraw the cigar or cigarette fully lit and ready to be smoked without having to resort to preliminary drawing of the cigar or cigarette.

Other objects and advantages will be made manifest from the following specification of an embodiment of the invention illustrated in the accompanying drawing, in which—

Fig. 1 is a side view of the electric cigar and cigarette lighter.

Fig. 2, is a vertical sectional view of the electric cigar and cigarette lighter.

Fig. 3 is a fragmentary cross-section of the cigar and cigarette lighter taken on the line 3—3 of Figure 2.

Fig. 4 is a fragmentary sectional view of a sleeve of the electric cigar and cigarette lighter taken on the line 4—4 of Figure 3.

The details of construction and operation of the invention are as follows:

A threaded sleeve 2 adapted to insertion through an instrument board 3 of a motor vehicle not herein shown, is adapted to be retained firmly upon the instrument board by a nut 4 threaded on the inner end of the sleeve 2 and working against a flange 5 which is formed from the outer end of the sleeve. A cylindrical body 6 is fitted tightly within the threaded sleeve 2 and projects rearwardly thereof. The cylindrical body comprises a pair of substantially identical halves 7 and 8 being so formed in order to facilitate assembling of the lighter, and the two halves are clipped securely together.

The cylindrical body thus formed is calculated to remain stationary in the threaded sleeve tube and is formed with a pair of oppositely disposed curved slots 9 and 10, these slots being adapted to act as guideways for a cam washer hereinafter described.

A rotating sleeve 11 is adapted to freely rotate within the cylindrical body 6 and has radially turned lips 12 at its inner end, which are adapted to engage a fibre washer 13 placed over the end of the cylindrical body. The rotating sleeve has an enlarged diameter adjacent the end of the cylindrical body 6 the enlarged portion being adapted to freely rotate within the threaded sleeve 2, and the rotating sleeve is then flared outwardly to provide a cup 14 which in turn receives a cap 15.

The cap 15, may be of ornamental design, but essentially constitutes a cylindrical base which is adapted to snugly fit in the cup portion 14 of the rotating sleeve. A series of ventilating apertures 16 are cut through the side walls of the cap and the forward end of the cap has a turned in edge 17 which provides an annular passage adapted to the reception of cigars or cigarettes.

Disposed within the cap 15 is a plurality of leaf springs 18 which form a yieldable constriction and are adapted to accommodate different sizes of cigars or cigarettes and to hold the same firmly in place.

A washer 19, preferably made of bronze or good conductive material is disposed at the inner end of the cap 15, seating firmly against the rotating sleeve 11 and has an aperture 20 through which a hollow needle 21 projects so that the hollow needle does not touch any portion of the washer 19. The parts thus far described should be made of electrical conductive material so as to provide an electrical ground for a circuit hereinafter described.

A sleeve 22 is formed integrally with the washer 19 and extends inwardly therefrom, enclosing an annular composition block 24 in which is partly imbedded an electrical heating element 23. The sleeve with its enclosed elements is readily removable from the rotating sleeve 11 as for the purpose of cleaning, the hollow needle providing a tangible grasping medium. The heating element 23 is grounded at one end upon the metal washer 19 and the body of the heating element describes a circular coil concentric with the aperture 20 and smaller than said aperture and surrounding the hollow needle 21; the opposite end of the coil being contacted with the said hollow needle. The hollow needle is firmly held in place in the composition block 24.

Immediately adjacent the composition block and within the sleeve 22 is a ring 25, and next to the ring also within the said sleeve is a washer 26 of rubber, or other resilient material against which the sleeve washer 27 which encompasses a tube 28 is adapted to abut. It will be seen that when the sleeve washer 27 is against the resilient washer 26, a substantially air-tight chamber 29 is provided. The tube 28 is formed with a constriction 30 which is adapted to facilitate an electrical wire contact 31, the wire 32 leading to a source of electrical energy such as the storage battery of the automobile.

Coupled to the outer end of the tube 28 is a flexible hose 33, which terminates at a nipple 34 which is tapped into an intake manifold 35.

The forward extension of the tube 28 passes through the fibre washer 13 and has a rigid fit in the sleeve washer 27, terminating at the inner end of the hollow needle 21, as illustrated in the position of the parts shown in Figure 2.

A cam washer 36 tightly embraces the sleeve washer 27 and is provided with a pair of oppositely disposed lugs 37 and 38 which are adapted to slide within the cam slots 9 and 10.

A retractile spring 39 encircles the tube 28 secured at one end to the fibre washer 13 and at the other end to the sleeve washer 27.

It will be noted that the forward or sharpended end of the hollow needle 21 has a plurality of apertures 40.

In the operation of the invention the tube 28 and the hollow needle 21 will be normally separated when the electric cigar and cigarette lighter is not in use and no circuit will be completed through the heating element 23. When it is desired to use the lighter, the cap 15 is given a quarter turn to the right. This causes the rotating sleeve 11 to be also turned to the right and the lugs 37 and 38 which project through apertures in the rotating sleeve are forced to rotate with the said sleeve and as the lugs travel in the curved slots 10 of the stationary cylindrical body 6, the lugs are moved forwardly carrying with them the sleeve washer 27 and consequently the tube 28. The forward end of the sleeve washer 27, will then abut against the resilient washer 26 and the forward end of the tube 28 will join the inner end of the hollow needle 21. Two distinct functions then occur, an electric circuit is established through the wire 32 and the tube 28 with the hollow needle 21, thence through the heating coil 23 which is grounded to the metal washer 19 and consequently is grounded to the body of the automobile. At the same time a substantially air-tight communication is effected between the hollow needle 21 and the tube 28 which has a constant suction occurring when the automobile motor is running. The cigar or cigarette, not herein shown, should be inserted through the passage 17 and jammed on to the hollow needle 21, being held therein by the leaf springs 18. The end of the cigar or cigarette will then be ignited by the heating coil 23 and a draft or suction established through the apertures 40 and the tube 28 will definitely assist in lighting the end of the cigar or cigarette without any drawing upon the part of the smoker, and the cigar or cigarette may be withdrawn from the lighter ready to smoke.

Various changes may be made without departing from the spirit of the invention.

What is claimed is:

1. An electric cigar lighter comprising in combination an electric heating element adapted to ignite a cigar, a suction tube, means forming an electric circuit through the suction tube and the heating element, and said suction tube being operative on the end of the cigar to be lighted only to create a draft.

2. An electric cigar lighter comprising in combination a heating element adapted to ignite a cigar, the heating element being relatively stationary, a slidable suction tube, said tube forming part of an electric circuit, means to establish a circuit through said tube and the heating element in one position and to break said circuit in another position, said suction tube being operative on the end of the cigar to be lighted only to create a draft.

3. An electric cigar lighter comprising in combination a heating element, a conducting tubular element associated therewith, a suction tube having an electric connection, means to cause relative movement of the electric heating element and its conducting tube to form a contact therewith with the suction tube and thereby establish a circuit through the heating element, the tubular element and suction tube being operative on the end of the cigar to be lighted only to create a draft.

4. An electric cigar lighter comprising in combination an electric heating element, a tubular conducting element electrically connected to said heating element, a suction tube, an electric connection therewith, means adapted to support a cigar with the end to be lighted against the heating element, said means being rotatable, and an operative connection with the suction tube adapted to move said tube into contact with the said tubular conducting element on rotation of the cigar holding means to form an electric circuit through the heating element and to form a suction connection on the end of the cigar to be lighted.

5. An electric cigar and cigarette lighter comprising a heating element adapted to ignite the end of a cigar or cigarette, a hollow needle projecting from said heating element and adapted to receive the cigar or cigarette.

6. An electric cigar and cigarette lighter comprising an electric heating element adapted to ignite the end of a cigar or cigarette, a hollow needle having apertures in the end thereof and adapted to receive the end of the cigar or cigarette, and a means for creating a suction through the hollow needle whereby a draft will be effected at the end of the cigar or cigarette being lighted.

7. An electric cigar and cigarette lighter comprising a heating element adapted to ignite a cigar or cigarette, a hollow needle adjacent the heating element and having apertures therein and adapted to receive the end of the cigar or cigarette to be lighted, a rotating sleeve enclosing said heating element and hollow needle and means whereby the rotation of said sleeve will establish an electric circuit through said heating element and create a suction through the apertures of the hollow needle.

8. In an electric cigar and cigarette lighter including a rotating sleeve and a stationary cylindrical body, a removable sleeve enclosing a heating element adapted to ignite a cigar or cigarette and a hollow needle projecting from said heating element.

In testimony whereof I have signed my name to this specification.

MAURICE TRAPET.